Patented Oct. 29, 1929

1,733,341

UNITED STATES PATENT OFFICE

RUSSELL BENJAMIN FRISBEY, OF OAKLAND, CALIFORNIA

COMPOSITION OF MATTER

No Drawing.  Application filed April 18, 1927. Serial No. 184,839.

My invention relates to improvements in compositions and it consists in the steps hereinafter set forth.

An object of my invention is to provide a composition which may be mixed with calcimine so as to cause the calcimine to cover one-fourth to one-third more surface than it formerly did, the cost of the calcimine thus saved paying for the cost of the composition.

A further object of my invention is to provide a composition which will not harm the quality of the calcimine and which when mixed with the calcimine, makes sizing of the wall prior to the calcimine unnecessary.

A further object of my invention is to provide a composition and a process for making said composition which when mixed with the calcimine will hold the component parts of the calcimine in suspension, thus preventing the marking of the wall, which usually occurs when calcimine is left to stand for some time.

A further object of my invention is to provide a composition which when mixed with calcimine permits the calcimine to be worked freely and which further prevents the calcimine from drying too quickly.

The composition consists of the following ingredients:

| | |
|---|---|
| Irish moss | 1 lb. |
| Silicate of soda | 1 pint |
| Coal oil | ½ pint |
| Sal soda | ¼ pint |

These ingredients when mixed with sufficient water will make five gallons of semi-liquid paste.

In preparing the compositions, I employ the following process: The Irish moss is boiled in water four times its bulk. The boiling is done in an open vessel and continues for a duration of 15 minutes. As soon as the boiling starts, however, the sal soda is added and the mass is stirred until the mixture is dissolved.

When the 15 minute period of boiling is over, the coal oil is added and stirred so as to be thoroughly mixed with the other ingredients. After five more minutes of boiling the silicate of soda is added and the solution is stirred while the soda is being added. The boiling is now stopped and cold water is immediately added to make a bulk of 5 gallons.

The composition is now filtered by straining it through a bone coal filter having a mesh similar to cheese cloth. The composition is now left to stand for a week to ten days until all of the ingredients are thoroughly mixed.

In addition to the advantages set forth in the first part of the specification, it is possible to use the composition to touch up spots in the wall which appear after the calcimine has dried without the spots showing. This is due to the fact that the composition when mixed with the calcimine keeps the ingredients of the calcimine in suspension at all times, and therefore the calcimine has the same color throughout.

In addition to this, markings on the wall may be covered up. To do this a portion of the composition is mixed with calcimine, that is, a portion of the calcimine and composition already mixed for use in calciming a wall, is mixed with dry plaster of Paris until it makes a thick paste. This paste is then thinned out with water until it can be spread with a brush. The spots on the wall are now covered with this material and the material is left to dry on the wall. After the material is thoroughly dried, the entire wall can be tinted and the spots will not show. One half pint of the composition is mixed with one gallon of calcimine, thus making it possible for 5 gallons of the composition to be used with 40 gallons of calcimine.

I claim:

A process of making a composition for the purpose described, comprising the following steps: the boiling of Irish moss in water four times the bulk of the moss; the addition of sal soda at the beginning of the aforesaid boiling; the mixing of coal oil after the aforesaid ingredients have boiled for fifteen minutes; the addition of silicate of soda five minutes after the addition of the coal oil; the addition of cold water immediately after the boiling is stopped; and the straining of the mixture thru a bone coal filter.

In testimony whereof I affix my signature.

RUSSELL BENJAMIN FRISBEY.